(12) United States Patent  (10) Patent No.: US 8,607,156 B1
Jania et al.  (45) Date of Patent: Dec. 10, 2013

(54) SYSTEM AND METHOD FOR INDICATING OVERSCROLLING IN A MOBILE DEVICE

(71) Applicant: Google Inc., Mountain View, AZ (US)

(72) Inventors: Frank Jania, Oceanside, NY (US); Gabriel Aaron Cohen, Alameda, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/753,220

(22) Filed: Jan. 29, 2013

Related U.S. Application Data

(63) Continuation of application No. 13/587,679, filed on Aug. 16, 2012.

(51) Int. Cl.
  *G06F 3/048* (2013.01)
(52) U.S. Cl.
  USPC .......................... 715/787; 715/786; 715/974
(58) Field of Classification Search
  USPC ........................................................ 715/787
  See application file for complete search history.

(56) References Cited

U.S. PATENT DOCUMENTS

| 7,469,381 B2 | 12/2008 | Ording | |
| 2009/0070711 A1* | 3/2009 | Kwak et al. | 715/829 |
| 2011/0055752 A1* | 3/2011 | Rubinstein et al. | 715/784 |
| 2011/0107264 A1* | 5/2011 | Akella | 715/830 |
| 2011/0202859 A1* | 8/2011 | Fong | 715/769 |
| 2012/0066621 A1* | 3/2012 | Matsubara | 715/764 |
| 2012/0278754 A1* | 11/2012 | Lehmann et al. | 715/784 |
| 2013/0014051 A1* | 1/2013 | Lefor et al. | 715/787 |

* cited by examiner

*Primary Examiner* — Alvin Tan
(74) *Attorney, Agent, or Firm* — Shumaker & Sieffert, P.A.

(57) ABSTRACT

A system and method for indicating overscrolling in a mobile device is provided. The method may include outputting, at a display operatively coupled to a computing device, a graphical representation of at least one content item. The method may further include receiving, at the computing device, a user input and in response to the user input, scrolling the graphical representation of the at least one content item in a direction on the display. The method may further include determining, by the computing device, that the graphical representation of the at least one content item has reached a bound associated with a visible portion of the display. In response to the determining, updating, by the computing device, a visual aspect of a scrollbar slider output at the display.

15 Claims, 12 Drawing Sheets

SYSTEM AND METHOD FOR INDICATING OVERSCROLLING IN A MOBILE DEVICE

RELATED APPLICATIONS

The present application is a continuation of U.S. patent application Ser. No. 13/587,679 filed Aug. 16, 2012, which is incorporated by reference in its entirety.

TECHNICAL FIELD

This disclosure relates to mobile devices and, more particularly, to a method for indicating overscrolling in a mobile device.

BACKGROUND

In many of today's portable computing devices (e.g. a smartphones), when a user has scrolled beyond the visible part of the content in a viewport on a touchscreen device an indication of an overscrolling event may be provided back to the user. Some existing methodologies include presenting an empty background to the user once the user has scrolled beyond the established bounds. Other techniques for indicating overscrolling include the appearance of the color of the bound the user is breaching being "pulled" in the direction of the breach.

SUMMARY OF DISCLOSURE

In one implementation, a method, in accordance with this disclosure, may include outputting, at a display operatively coupled to a computing device, a graphical representation of at least one content item. The method may further include receiving, at the computing device, a user input and in response to the user input, scrolling the graphical representation of the at least one content item in a direction on the display. The method may also include determining, by the computing device, that the graphical representation of the at least one content item has reached a bound associated with a visible portion of the display and in response to the determining, updating, by the computing device, a visual aspect of a scrollbar slider output at the display.

One or more of the following features may be included. In some variations, updating may include changing a color of the scrollbar slider output. Updating may also include changing at least a portion of the scrollbar slider output. Updating may include changing a size of at least a portion of the scrollbar slider output. In some variations, updating may include changing a representation of at least a portion of the scrollbar slider output.

In another implementation, a non-transitory processor readable storage medium having a plurality of instructions stored thereon is provided. In some variations, the instructions, which when executed by a processor, cause the processor to perform one or more operations. Some operations may include outputting, at a display operatively coupled to a computing device, a graphical representation of at least one content item. Operations may further include receiving, at the computing device, a user input and in response to the user input, scrolling at least a portion of the graphical representation of the content item along an axis of the display. Operations may further include determining, by the computing device, that the graphical representation of the content item has reached a bound associated with the display and in response to the determining, updating, by the computing device, a visual aspect of a scrollbar slider output at the display, the output being indicative of an overscrolling event.

One or more of the following features may be included. In some variations, updating may include changing a color of the scrollbar slider output. Updating may also include changing at least a portion of the scrollbar slider output. Updating may include changing a size of at least a portion of the scrollbar slider output. In some variations, updating may include changing a representation of at least a portion of the scrollbar slider output.

In another implementation, a computing system is provided. In some variations, the computing system may include one or more processors configured to output, at a display operatively coupled to a computing device, a graphical representation of at least one content item. The one or more processors may be further configured to receive, at the computing device, a user input. In response to the user input, the one or more processors may be further configured to scroll the graphical representation of the at least one content item in a direction on the display. The one or more processors may be further configured to determine, by the computing device, that the graphical representation of the at least one content item has reached a bound associated with a visible portion of the display. In response to the determining, the one or more processors may be further configured to generate, by the computing device, a new feature associated with a scrollbar slider output at the display.

One or more of the following features may be included. In some variations, generating the new feature of the scrollbar slider output may include changing a color of the scrollbar slider output. In some variations, generating the new feature of the scrollbar slider output may include changing at least a portion of the scrollbar slider output. In some variations, generating the new feature of the scrollbar slider output may include changing a size of at least a portion of the scrollbar slider output. In some variations, generating the new feature of the scrollbar slider output may include changing an image of at least a portion of the scrollbar slider output or substituting one image for another for at least a portion of the scrollbar slider output. In some variations, updating may include changing a representation of at least a portion of the scrollbar slider output.

In another implementation, a method, in accordance with this disclosure, may include outputting, at a display operatively coupled to a smartphone, a graphical representation of at least one content item. The method may further include receiving, at the smartphone, a user input and in response to the user input, moving at least one portion of the graphical representation of the plurality of content item within the display. The method may also include determining, by the smartphone, that the at least one portion of the graphical representation of the at least one content item has reached a bound associated with a visible portion of the display. In response to the determining, the method may include generating, by the smartphone, an output at the display, the output indicative of an overscrolling event and updating a visual aspect of the output at the display.

One or more of the following features may be included. Updating may include changing a color of the scrollbar slider output. Updating may also include changing at least a portion of the scrollbar slider output. Updating may also include changing at least a portion of the image of the scrollbar slider output or substituting one image for another for at least a portion of the scrollbar slider output. Updating may further include changing a size of at least a portion of the scrollbar slider output. In some variations, updating may include changing a representation of at least a portion of the scrollbar slider output.

In another implementation, a mobile computing device may include a display, a non-transitory, processor-accessible memory, a processor communicatively coupled to said display and said memory, and configured to output on the display a scrollable display window and a scrollbar and scrollbar slider, the processor further configured to determine a scroll position of the scrollable display window, and indicate the scroll position by way of an output position of the scrollbar slider, a command receiving module configured to receive a scroll command to change the scroll position of the scrollable display window, a position determination module configured to determine if the scroll command results in at least a portion of the scrollable display window scrolling beyond a window boundary, and an indicator selection module for selecting a slider indication from among a plurality of slider indications resident in said memory, the selecting being a function of whether the position determination module determines that the scroll command results in at least a portion of the scrollable display window scrolling beyond a window boundary.

In another implementation, a computer-implemented method may include outputting a scrollable display window on a display device. The method may further include outputting a scrollbar with a position thereof indicated by a slider and determined as a function of a scroll position of the scrollable display window. The method may also include receiving a scroll command to scroll the scrollable display window. The method may further include determining if the scroll command results in at least a portion of the scrollable display window scrolling beyond a window boundary. The method may also include altering a representation of a portion of the scrollbar if the scroll command is determined to scroll the at least a portion of the scrollable display window beyond the boundary.

One or more of the following features may be included. The method may include outputting a window boundary indicator at a location at which the representation of the portion of the scrollbar is altered. In some implementations, the window boundary indicator may include a visual representation indicating the window boundary. In some implementations, the window boundary indicator may include a non-visual representation indicating the window boundary.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

The terms "scrollbar" or "scrollbar slider" may refer to an object in a graphical user interface ("GUI") with which text, pictures, or other content may be scrolled. This disclosure concerns a novel methodology for indicating overscrolling associated with a portable computing device (e.g., a smartphone). When a user has scrolled beyond the extent of the content, or a window in which content is rendered, in a viewport on a touchscreen device feedback may be provided to the user for informational purposes.

Some existing methodologies include presenting an empty background to the user once the user has scrolled beyond the established bounds of the content or window. Other techniques for indicating overscrolling include the appearance of the color of the bound the user is breaching being "pulled" in the direction of the breach.

The present disclosure provides for various alterations to a scrollbar slider, of a type used to scroll through content, indicative of scrolling past the extent of the content or window. Upon reaching or exceeding a bound associated with the viewable content, an alteration may occur to the scrollbar slider, therefore notifying the user of an overscroll condition.

As discussed above and referring also to FIGS. 1-5, a number of implementations in accordance with overscroll indication process are provided. Accordingly, overscroll indication process may output (702), at a display 102 operatively coupled to a computing device, a graphical representation of at least one content item 104. For the purposes of this disclosure, the term "content" may refer to its understood meaning as well as to any information, pictures, text, etc. viewable through a display. For example, at least one content item 104 may correspond to portions of a webpage, email application, or any other suitable content provider.

Figure 7:
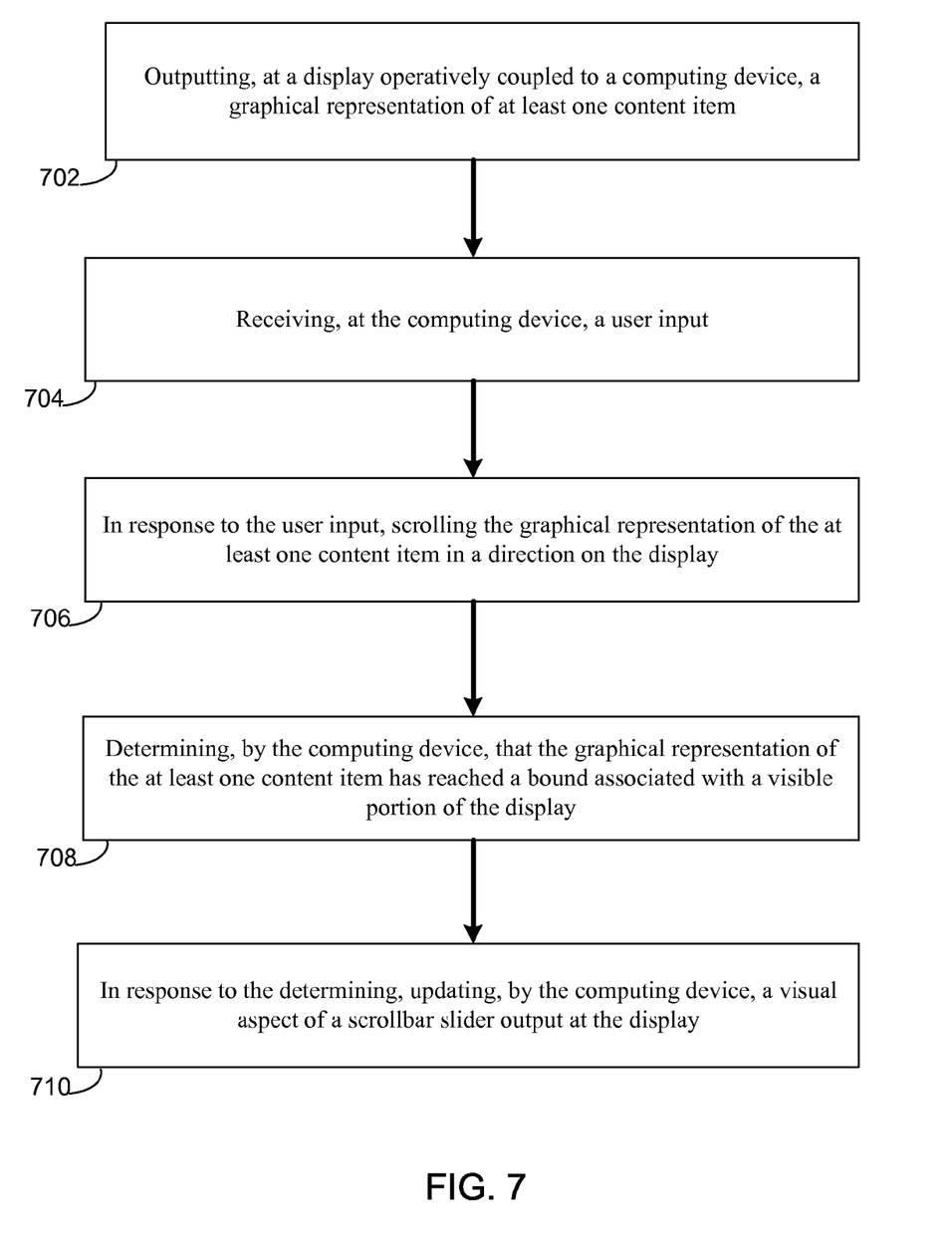
FIG. 7 is a flowchart depicting operations consistent with an implementation of the present disclosure.

Display 102 may further include or be associated with scrollbar slider 106, which may generally indicate the position of the viewable portion of the content with respect to the entirety of the content page. In this way, overscroll indication process may also receive (704) a user input and in response to the user input, scroll (706) the graphical representation of at least one content item in a direction on the display. In the example shown in FIG. 1A, a user may scroll downwards through the content by using the touchscreen associated with display 102. For example, a user may move their finger in an upwards direction 110 along the touchscreen associated with display 102 in order to scroll in a downwards direction, or vice-versa.

Figure 1A:
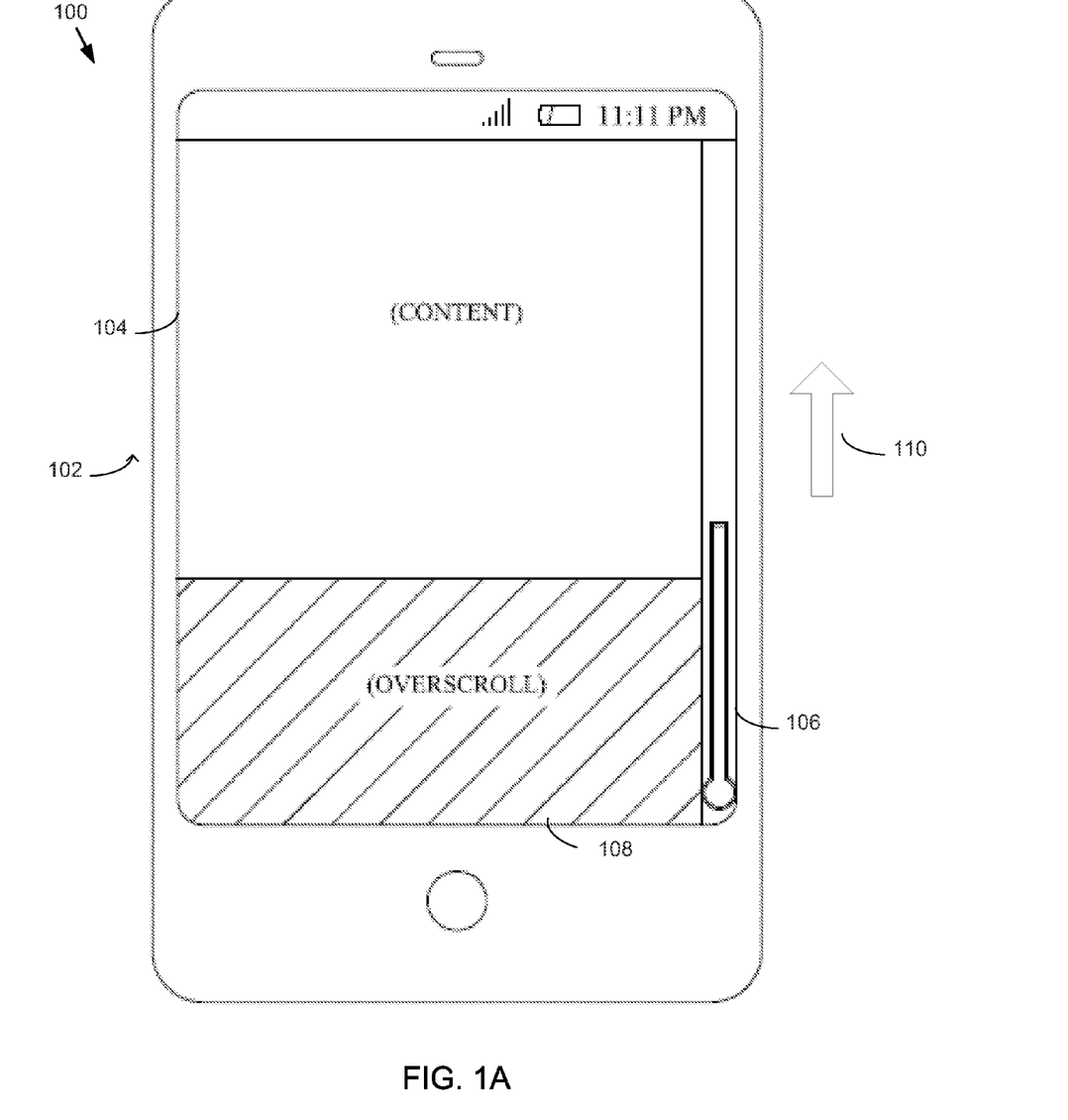
FIG. 1A is a diagrammatic view of a portable computing device configured to execute a method for indicating overscrolling in accordance with an implementation of the present disclosure.

Overscroll indication process may also determine (708) that the graphical representation of the at least one content item has reached a bound associated with a visible portion of the display. In some implementations, overscroll indication process may determine (708) that the graphical representation of the at least one content item has reached a bound associated with a visible portion of the content window. In this particular example, two distinct indications of overscrolling are shown as being provided to the user, namely, overscroll display indicator 108 and scrollbar slider 106. Accordingly, and in response to determining that a bound has been reached, overscroll indication process may update (710) a visual aspect of a scrollbar slider output at the display. In this particular example, an updated visual aspect of scrollbar slider 106 has been output at display 102, here, scrollbar slider 106 has been transformed so that the scrollbar slider has a dot or bulbous shape added to the end of the scrollbar to indicate the end has been reached. In some implementations, the transformed scrollbar slider may look similar to a thermometer with the bulbous end indicating the presence of an overscrolling event. Additionally and/or alternatively, overscroll display indicator 108 may be configured to display a new feature generated by the overscroll indication process and associated with a scrollbar slider output at the display. In some implementations, the new feature may include transforming the overscroll display indicator 108 to a different color, adding a gradient, or displaying a texture or image.

Figure 1B:
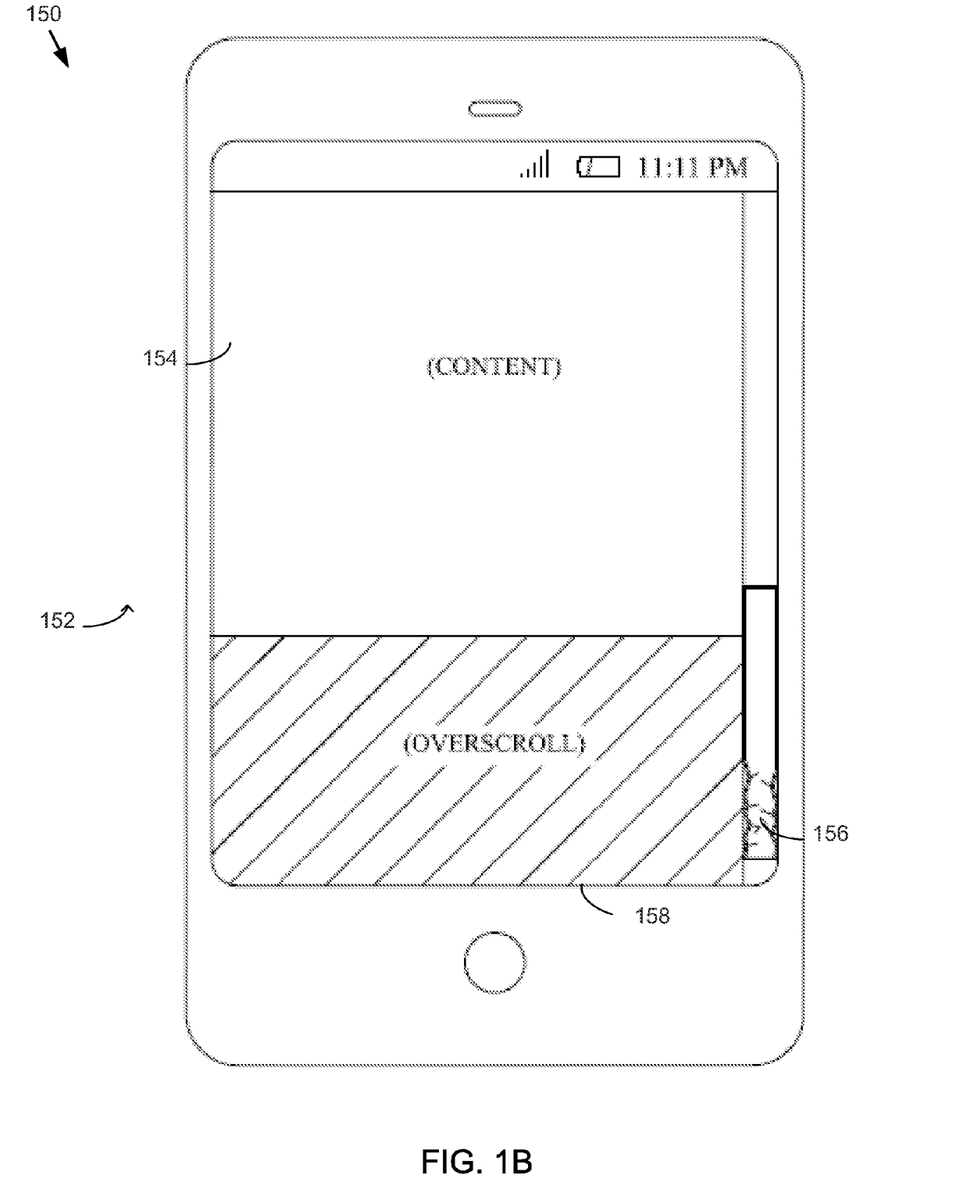
FIG. 1B is a diagrammatic view of a portable computing device configured to execute a method for indicating overscrolling in accordance with another implementation of the present disclosure.

Referring now to FIG. 1B, another implementation of overscroll indication process executing on portable computing device 150 is provided. In this particular example, the updated visual aspect of scrollbar slider 156 depicts a crushed portion of the slider which may be presented in display 152 when the graphical representation of the at least one content item 154 has reached a bound associated with a visible portion of the content window. The "crushed" portion of slider is located at the bottom of the slider (relative to the orientation of the device shown in FIG. 1B), indicating the bottom boundary of the content window has been reached. As discussed above, in some implementations, overscrolling may also be indicated by overscroll display indicator 158.

Figure 1C:
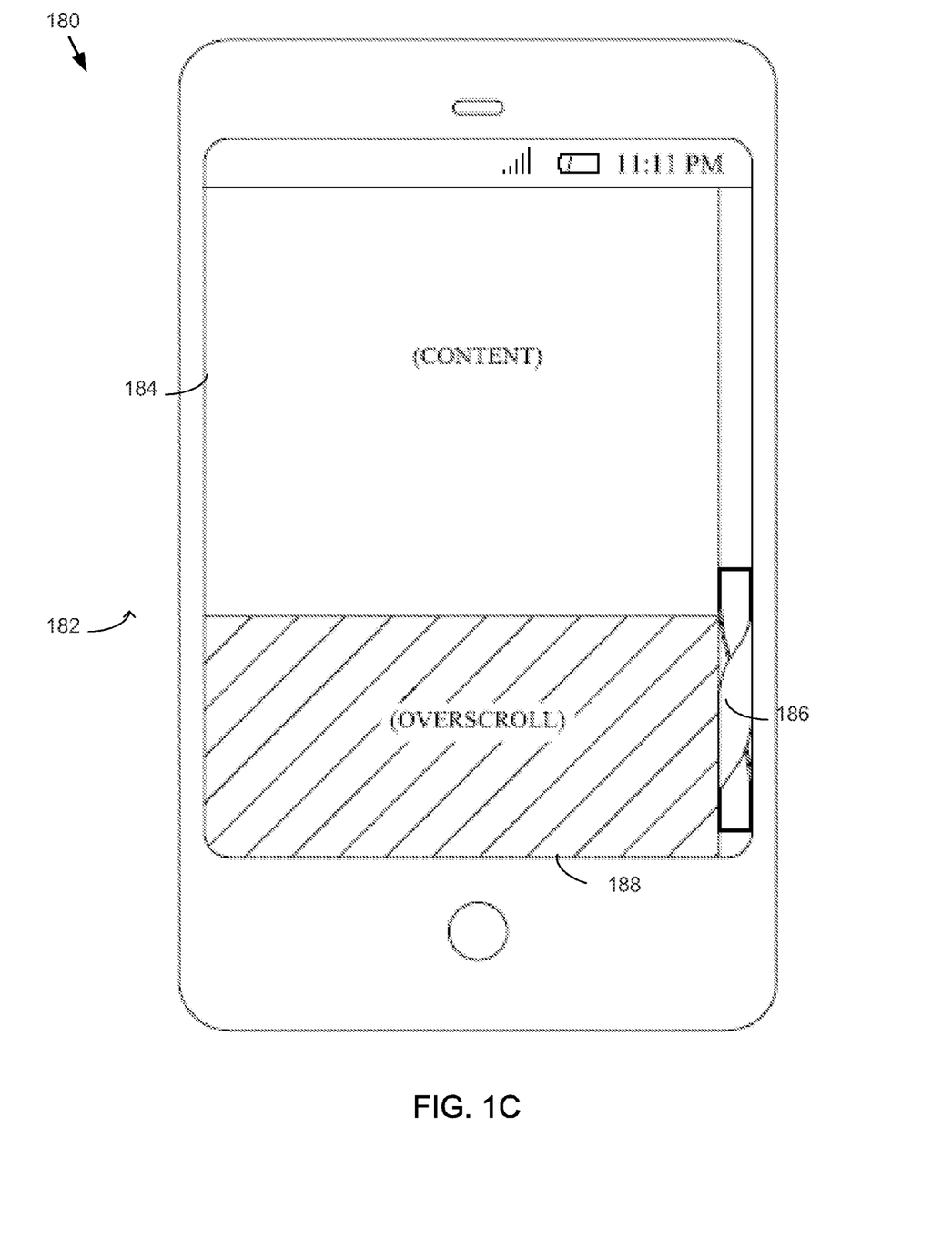
FIG. 1C is a diagrammatic view of a portable computing device configured to execute a method for indicating overscrolling in accordance with yet another implementation of the present disclosure.

Referring now to FIG. 1C, another implementation of overscroll indication process executing on portable computing device 180 is provided. In this particular example, the updated visual aspect of scrollbar slider 186 depicts a coil-like configuration which may be presented in display 182 when the graphical representation of the at least one content item 184 has reached a bound associated with a visible portion of the content window. In some implementations, overscrolling may also be indicated by overscroll display indicator 188.

Figure 2A:
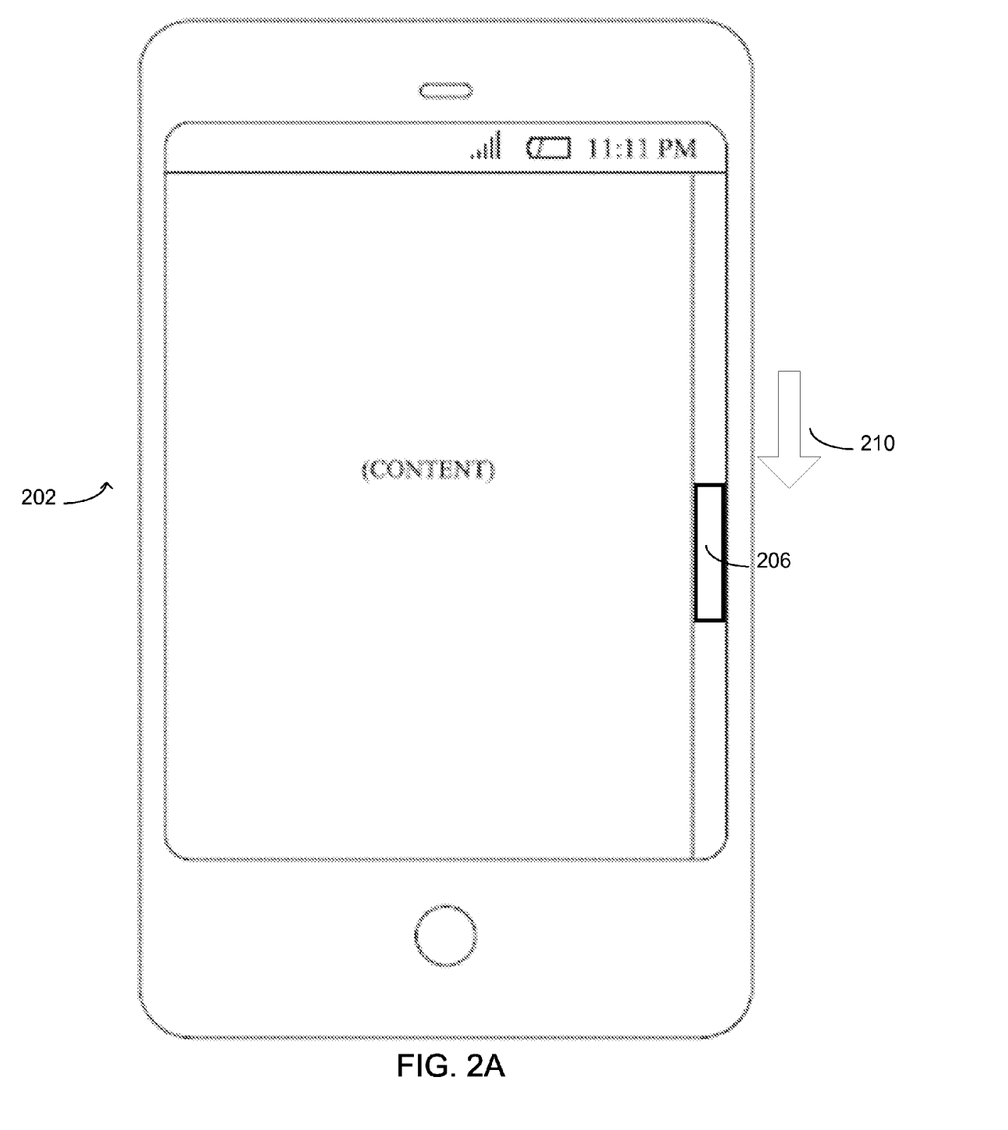
FIG. 2A-2C are diagrammatic views of a portable computing device configured to execute a method for indicating overscrolling in accordance with a still further implementation of the present disclosure.
Figure 2B:
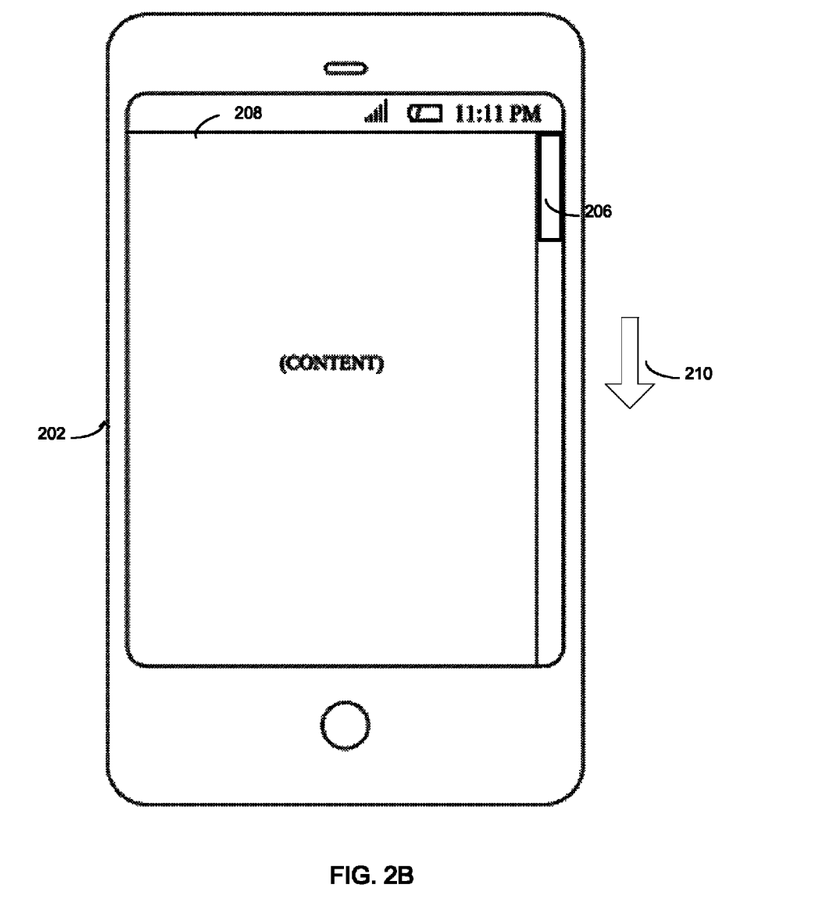
Figure 2C:
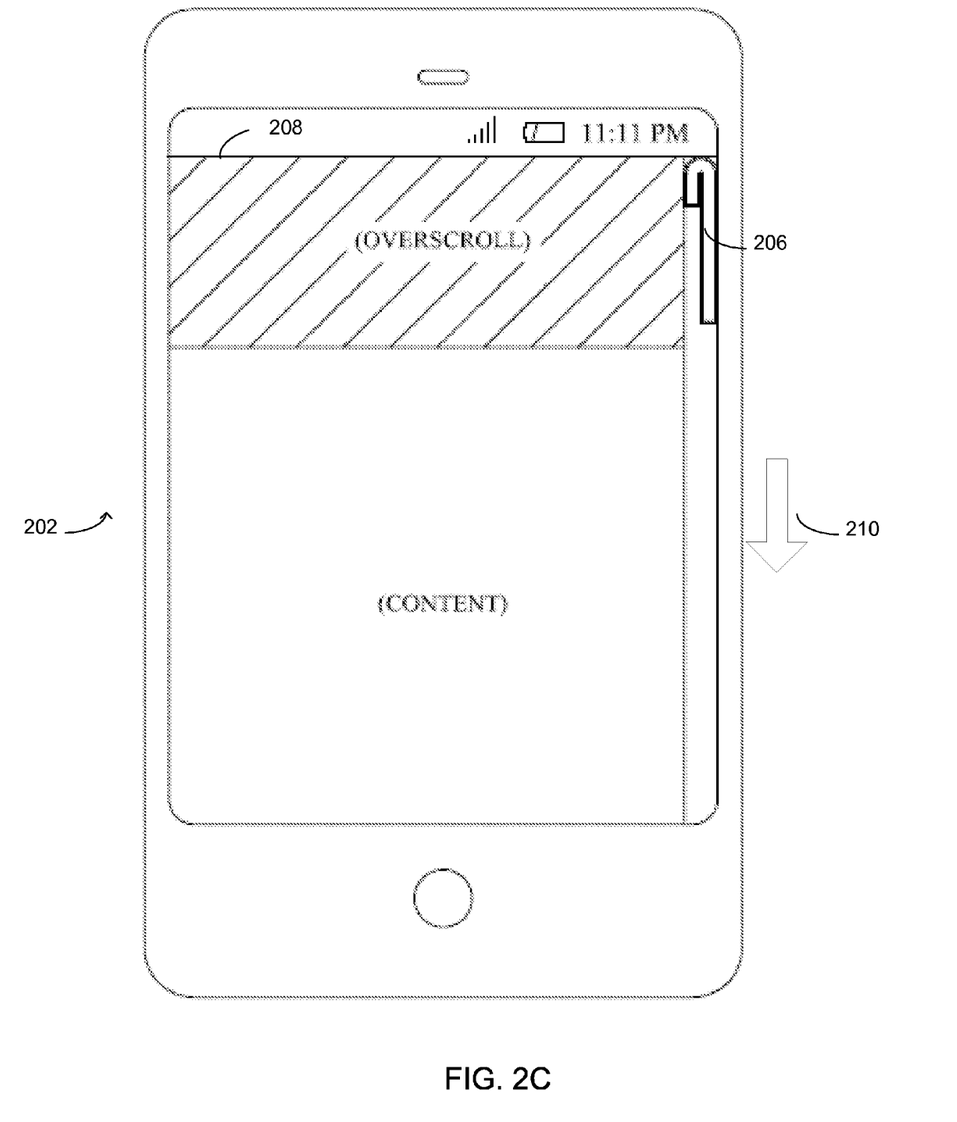

Referring now to FIG. 2A, another implementation of overscroll indication process is provided. In this particular example, the updated visual aspect of scrollbar slider 206 depicts a slider having a curved orientation, curving for example back in the direction of the content portion of the content window (evoking the idea of a "u-turn" to get back to the content). In the example shown in FIGS. 2A-2C, depict a user scrolling through the content by using the touchscreen associated with display 102. For example, the user may move their finger in a downwards direction 210 along the touchscreen associated with display 202 in order to scroll in an upwards direction as depicted by the scrollbar slider 206 in FIGS. 2A-2C. Accordingly, and in response to determining that a bound has been reached, overscroll indication process may update (710) a visual aspect of a scrollbar slider output at the display, in this case scrollbar slider curving back into the downward direction. The user may scroll upwards through the content (away from the top boundary of the content window) by using the touchscreen associated with display 202. For example, a user may move their finger downwards along the touchscreen associated with display 202 in order to scroll in a upwards direction.

Figure 3:
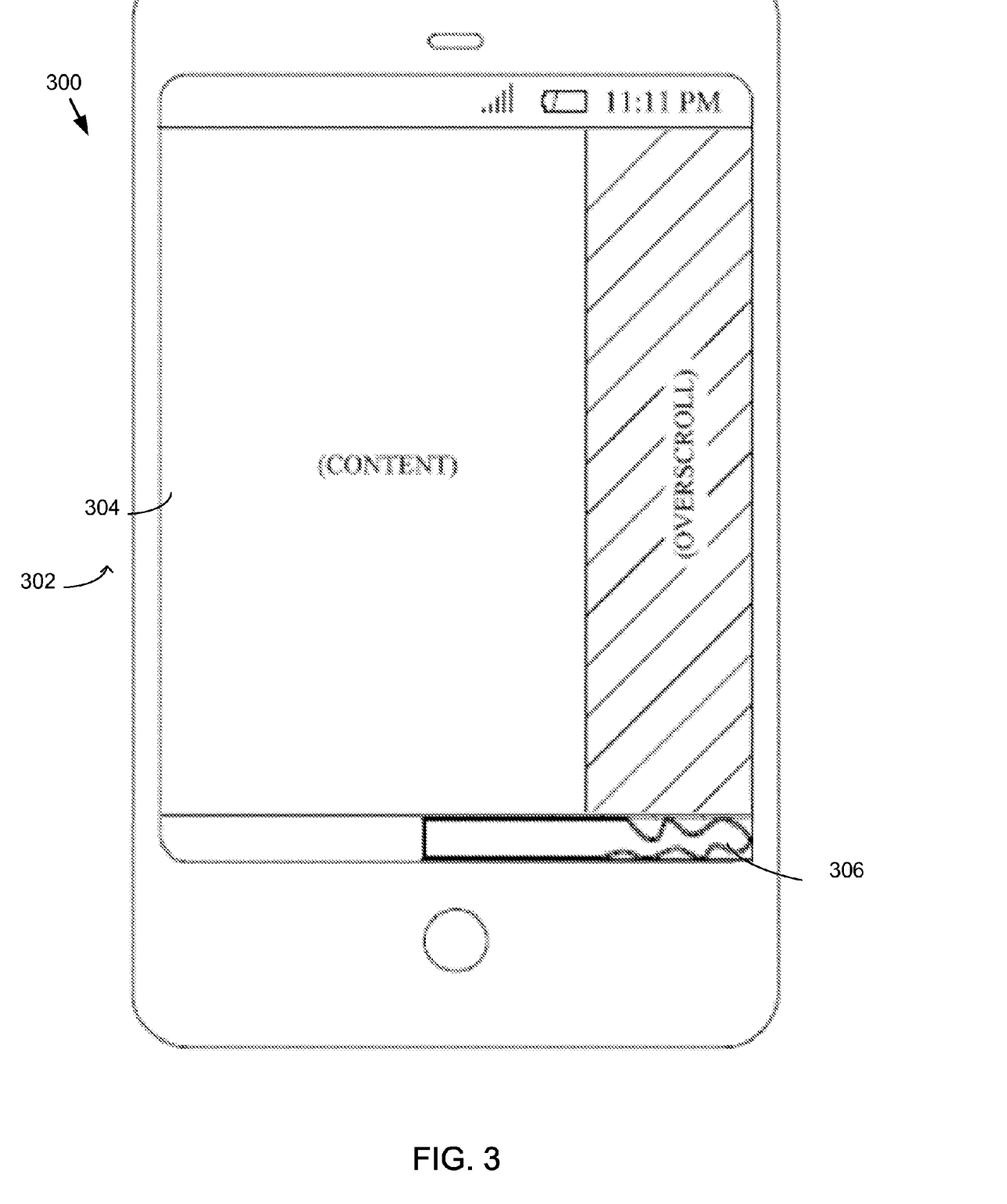
FIG. 3 are diagrammatic views of a portable computing device configured to execute a method for indicating overscrolling with yet a further implementation of the present disclosure.

Referring now to FIG. 3, another implementation of overscroll indication process executing on portable computing device 300 is provided. In this particular example, the updated visual aspect deformed scrollbar slider 306 which may be presented in display 302 when the graphical representation of the at least one content item 304 has reached a bound associated with a visible portion of the content window. In this implementation, the scrollbar indication process may allow for display and movement of scrollbar slider 306 along the horizontal axis of the display 302, as shown.

Figure 4:
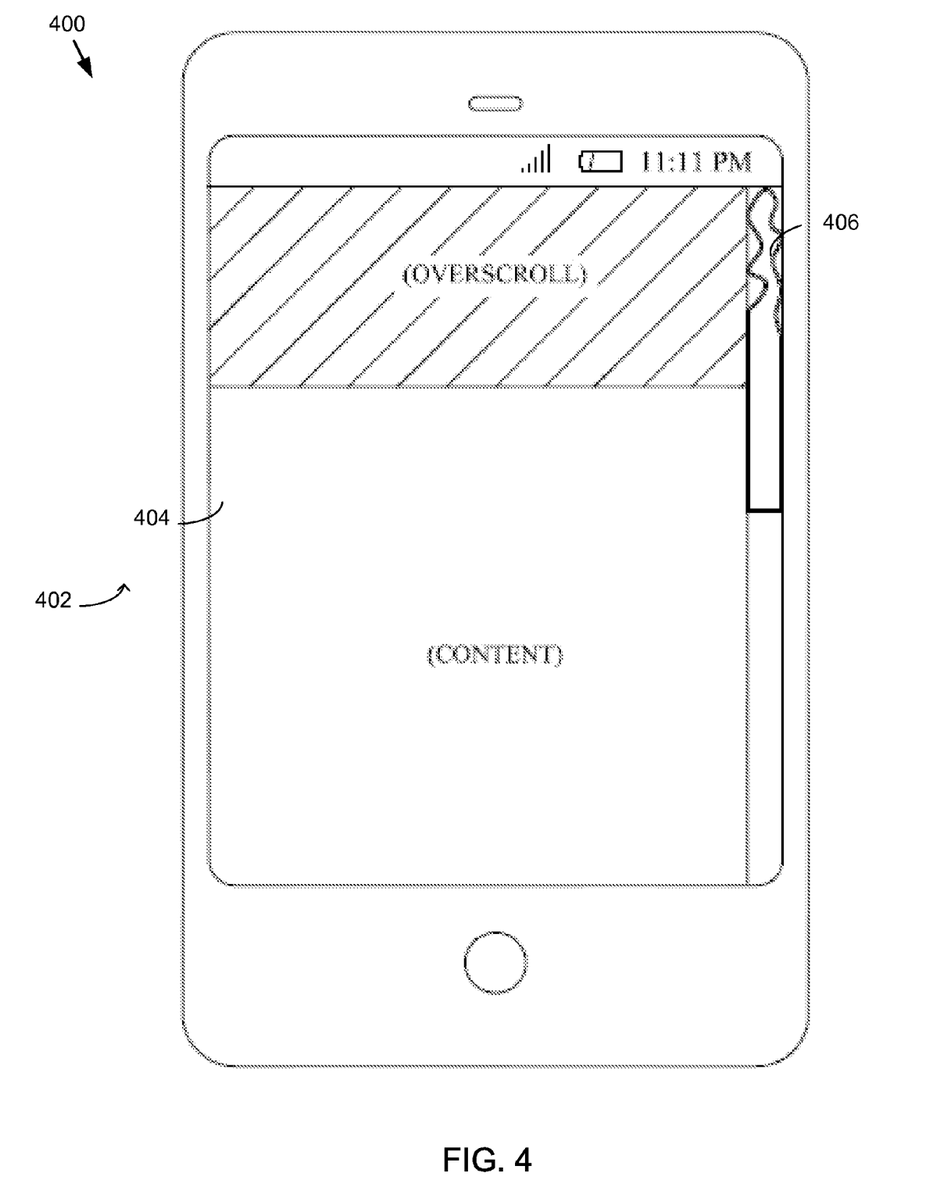
FIG. 4 is a diagrammatic view of a portable computing device configured to execute a method for indicating overscrolling in accordance with a yet further implementation of the present disclosure.

Referring now to FIG. 4, another implementation of overscroll indication process executing on portable computing device 400 is provided. In this particular example, the updated visual aspect of scrollbar slider 406 depicts a deformed slider. In this particular example, the scrollbar slider 406 may be presented in display 402 when the graphical representation of the at least one content item 404 has reached a bound associated with a visible portion of the content window. In this implementation, the scrollbar indication process may allow for display and movement of scrollbar slider 406 along the vertical axis of the display 302, as shown.

It should be noted that the overscroll indication process may allow for movement in any direction, for example, along a vertical axis, a horizontal axis or other axis as permitted by the portable computing device.

Figure 5:
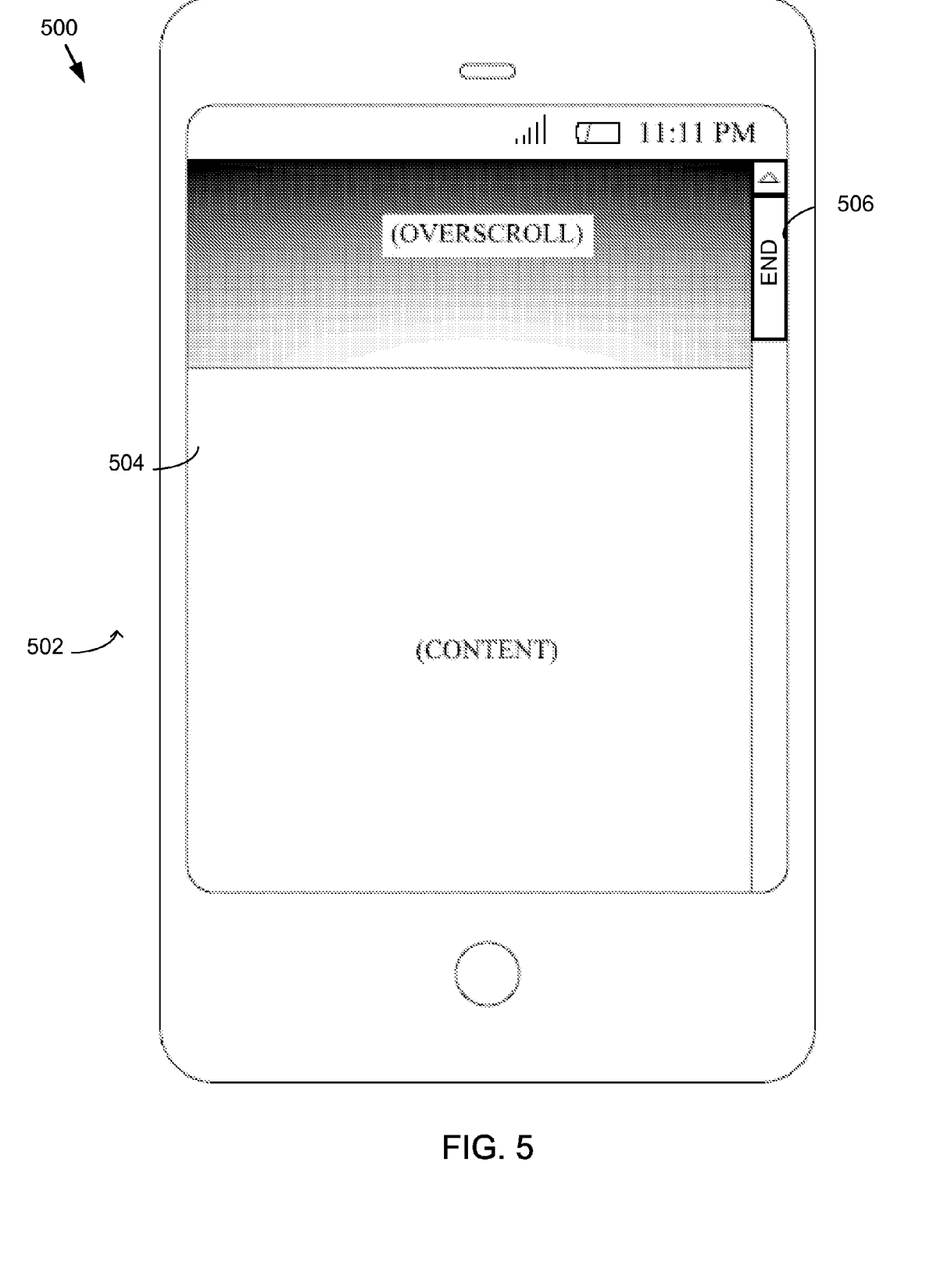
FIG. 5 is a diagrammatic view of a portable computing device configured to execute a method for indicating overscrolling in accordance with an additional implementation of the present disclosure.

Referring now to FIG. 5, another implementation of overscroll indication process executing on portable computing device 500 is provided. In this particular example, the updated visual aspect of scrollbar slider 506 depicts a slider having text added thereto. In this particular example, the word "end" is included within the scrollbar slider 506 which may be presented in display 502 when the graphical representation of the at least one content item 504 has reached a bound associated with a visible portion of the content window. Text may be present at all times in the slider 506, and change to descriptive text (such as "end") in an overscroll condition, or text may be present in (added to) the slider 506 when an overscroll condition is encountered. It should be noted that this is merely provided as an example, as any other suitable words or phrases may be used as well without departing from the scope of the present disclosure. In some implementations, a non-visual indicator may be executed by overscroll indication process to indicate an overscroll. Non-visual indicators may include but are not limited to vibrations or audio indicators that are executed when an overscroll is encountered. In some embodiments, non-visual indicators may be executed simultaneously or near-simultaneously as the visual indicators, such as any visual updates to the scrollbar slider 506 when an overscroll is encountered. Additionally and/or alternatively, updating a visual aspect of the scrollbar slider may include changing a color of the scrollbar slider output.

Figure 6:
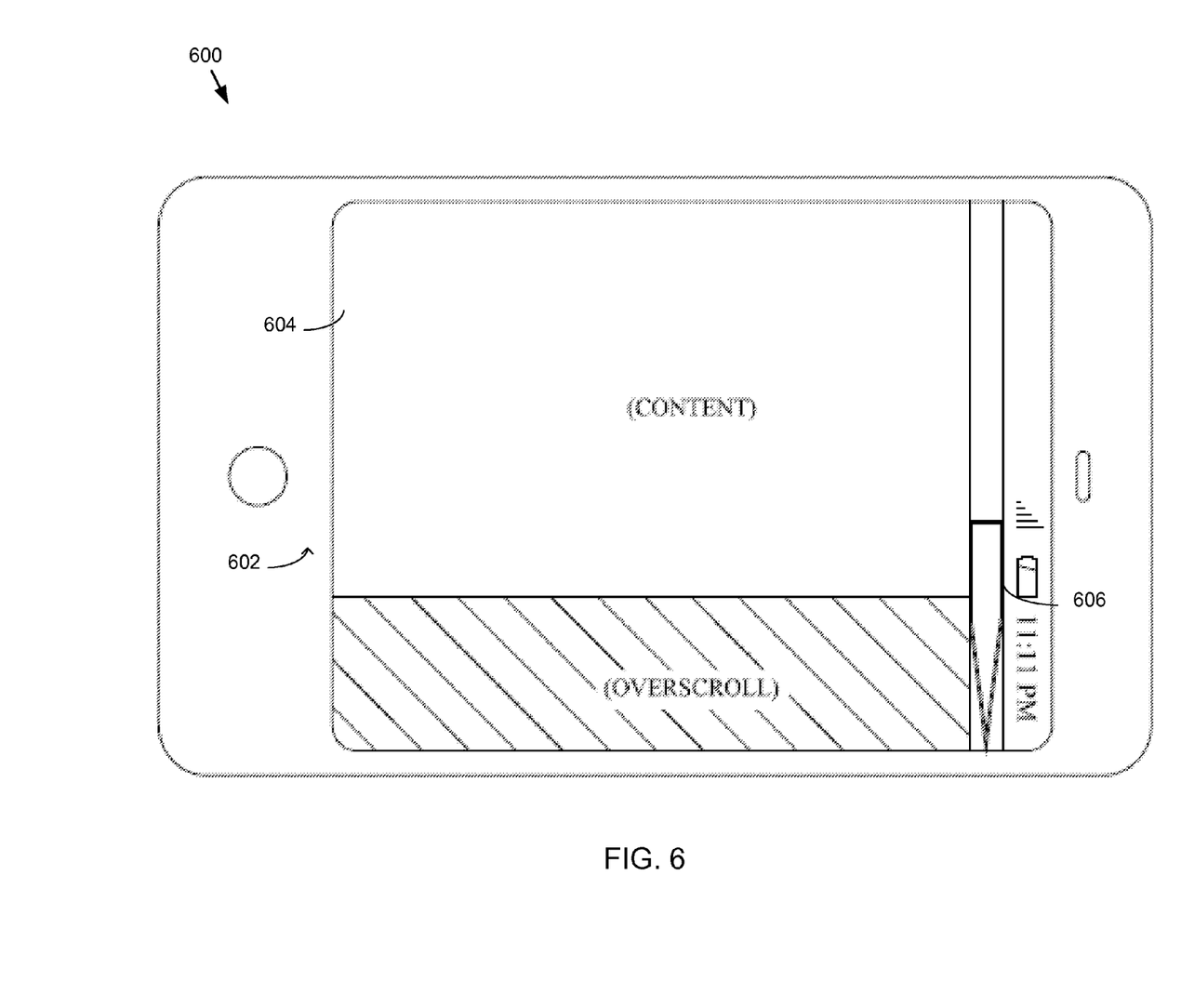
FIG. 6 is a diagrammatic view of a portable computing device configured to execute a method for indicating overscrolling in accordance with a further additional implementation of the present disclosure.

Referring now to FIG. 6, another implementation of overscroll indication process is provided. In this particular example, the updated visual aspect of scrollbar slider 606 depicts a tapering width of the slider. The narrowing of the slider invokes the idea of content tapering off as the width of the slider tapers off. Additionally, content 604 and scrollbar slider 606 are shown in a rotated fashion (e.g., rotated 180° within display 602 of device 600). Accordingly, overscroll indication process may allow for movement in any direction within any of the displays provided herein (e.g. display 602).

As shown in FIGS. 1-6, overscroll indication process may be configured to update a visual aspect of the scrollbar slider. In this way, updating may include changing at least a portion of the scrollbar slider output. For example, updating may include changing a size of at least a portion of the scrollbar slider output.

Additionally and/or alternatively, the overscroll indication process described herein may include numerous additional implementations, highlighting that the implementations described herein are merely examples of the array of possible processes. Other such examples include, but are not limited to, altering the size of one or more aspects of the scrollbar slider, animating one or more aspects of the scrollbar (such as transforming the scrollbar slider into a corkscrew shape that rotates on its axis) and so on. Additionally and/or alternatively, the scrollbar slider may be modified to such that the color effect is constrained to the scrollbar slider (as opposed to the display). In some implementations, the color of the scrollbar slider may become more darker/more saturated upon the occurrence of an overscrolling event. Additionally and/or alternatively, the color of the scrollbar slider may change along a gradient or may change throughout the entire slider uniformly. Any deformation or modification above may be combined without departing from the scope of the present disclosure.

Figure 8:
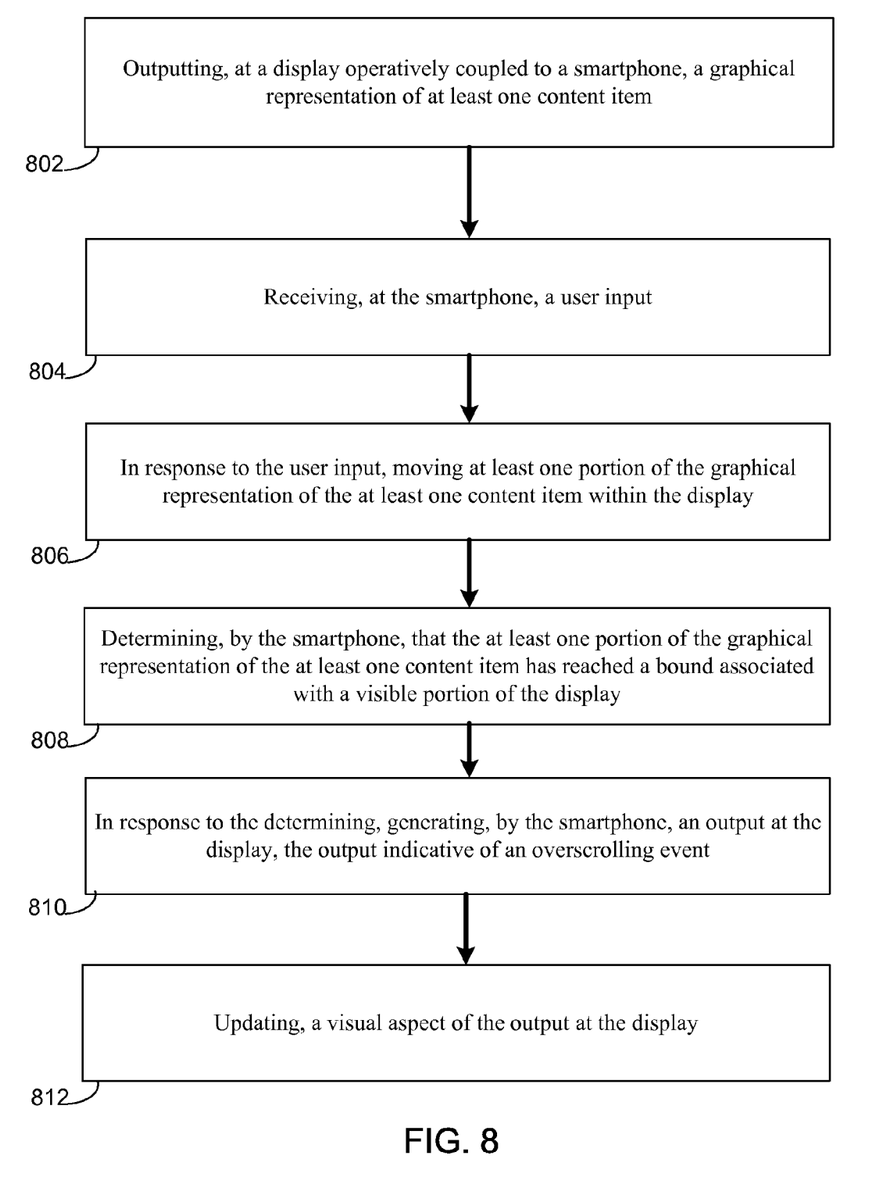
FIG. 8 is a flowchart depicting operations consistent with another implementation of the present disclosure.

As discussed above and referring also to FIG. 8, overscroll indication process may output (802), at a display operatively coupled to a smartphone, a graphical representation of at least one content item. Overscroll indication process may also receive (804), at the smartphone, a user input and in response to the user input, move (806) at least one portion of the graphical representation of the at least one content item within the display. Overscroll indication process may also determine (808), by the smartphone, that the at least one portion of the graphical representation of the at least one content item has reached a bound associated with a visible portion of the display. In response to the determining, overscroll indication process may generate (810), by the smartphone, an output at the display, the output indicative of an overscrolling event. Overscroll indication process may update (812) a visual aspect of the output at the display.

Referring again to FIGS. 1-3, the exterior appearance of an example device that implements an overscroll indication process is illustrated. In more detail, the hardware environment of the device 100 may include a display for displaying text, images, and video to a user; a keyboard for entering text data and user commands into the device 100; a pointing device for pointing, selecting, and adjusting objects displayed on the display; an antenna; a network connection; a camera/video camera; a viewport; a microphone; and a speaker. Device 100 may include an external or internal antenna, which may not be visible to the user. Additionally and/or alternatively, it should be noted that viewport may be located anywhere on computing device 100.

In some implementations, the display may be configured to display video, graphics, images, and text that make up the user interface for the software applications used by the device 100, and the operating system programs used to operate the device 100. Among the possible elements that may be displayed on the display are a new mail indicator that alerts a user to the presence of a new message; an active call indicator that indicates that a telephone call is being received, placed, or is occurring; a data standard indicator that indicates the data standard currently being used by the device 100 to transmit and receive data; a signal strength indicator that indicates a measurement of the strength of a signal received by via the antenna, such as by using signal strength bars; a battery life indicator that indicates a measurement of the remaining battery life; or a clock that outputs the current time.

The display may also show application icons representing various applications available to the user, such as a web browser application icon, a phone application icon, a search application icon, a contacts application icon, a mapping application icon, an email application icon, or other application icons. In one example implementation, the display may include a quarter video graphics array (QVGA) thin film transistor (TFT) liquid crystal display (LCD), capable of 16-bit or better color.

In operation, a user may use the keyboard (or "keypad") to enter commands and data to operate and control the operating system and applications. The keyboard may be a touchscreen or alternatively, may include standard keyboard buttons or keys associated with alphanumeric characters, such as keys and that are associated with the alphanumeric characters "Q" and "W" when selected alone, or are associated with the characters "*" and "1" when pressed in combination with key. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, keyboard may also include other special function keys, such as an establish call key that causes a received call to be answered or a new call to be originated; a terminate call key that causes the termination of an active call; a drop down menu key that causes a menu to appear within the display; a backwards navigation key that causes a previously accessed network address to be accessed again; a favorites key that causes an active web page to be placed in a bookmarks folder of favorite sites, or causes a bookmarks folder to appear; a home page key that causes an application invoked on the device 500 to navigate to a predetermined network address; or other keys that provide for multiple-way navigation, application selection, and power and volume control. As discussed above, additionally and/or alternatively, device 100 may include a touchscreen, which may replace some or all of the features discussed herein. For example, the keyboard may be removed in a touchscreen configuration.

In some implementations, the user may use a pointing device to select and adjust graphics and text objects displayed on the display as part of the interaction with and control of the device 100 and the applications invoked on the device 100. The pointing device may be any appropriate type of pointing device, and may be a joystick, a trackball, a touch-pad, a camera, a voice input device, a touch screen device implemented in combination with the display, or any other input device.

In some implementations, the antenna may be an external antenna or an internal antenna, and may be a directional or omni-directional antenna used for the transmission and reception of radiofrequency (RF) signals that implement point-to-point radio communication, wireless local area network (LAN) communication, or location determination. The antenna may facilitate point-to-point radio communication using the Specialized Mobile Radio (SMR), cellular, or Personal Communication Service (PCS) frequency bands, and may implement the transmission of data using any number or data standards. For example, the antenna may allow data to be transmitted between the device 100 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EG-PRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur.

The wireless or wireline computer network connection may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection may connect to a LAN network, a corporate or government WAN network, the Internet, a telephone network, or other network. The network connection uses a wireline or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wireline connectors include, for example, an IEEE-1394 FIREWIRE connector, a Universal Serial Bus (USB) connector (including a mini-B USB interface connector), a serial port connector, a parallel port connector, or other wireline connector. In another implementation, the functions of the network connection and the antenna are integrated into a single component.

In some implementations, a camera may allow device 100 to capture digital images, and may be a scanner, a digital still camera, a digital video camera, or other digital input device. In one example implementation, the camera may be a 5 megapixel (MP) camera that utilizes a complementary metal-oxide semiconductor (CMOS).

Microphone may allow the device 100 to capture sound, and may be an omni-directional microphone, a unidirectional microphone, a bi-directional microphone, a shotgun microphone, or other type apparatus that converts sound to an electrical signal. The microphone may be used to capture sound generated by a user, for example when the user is speaking to another user during a telephone call via the device 100. Conversely, the speaker allows the device to convert an electrical signal into sound, such as a voice from another user generated by a telephone application program, or a ring tone generated from a ring tone application program. Furthermore, although the device 100 is illustrated in FIGS. 1-3 as a handheld device, in further implementations the device 100 may be a laptop, a workstation, a midrange computer, a mainframe, an embedded system, telephone, desktop PC, a tablet computer, a PDA, or other type of computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The implementation was chosen and described in order to best explain the principles of the disclosure and the practical application, and to enable others of ordinary skill in the art to understand the disclosure for various implementations with various modifications as are suited to the particular use contemplated.

Having thus described the disclosure of the present application in detail and by reference to implementations thereof, it will be apparent that modifications and variations are possible without departing from the scope of the disclosure defined in the appended claims.

What is claimed is:

1. A computer-implemented method comprising:
    outputting, by a computing device and for display at a display device operatively coupled to the computing device, a graphical representation of at least one content item;
    receiving, by the computing device, an indication of a user input;
    responsive to receiving the indication of the user input, outputting, for display by the display device, a scrolling of the graphical representation of the at least one content item in a first direction on the display;
    determining, by the computing device, that the graphical representation of the at least one content item has reached a boundary associated with a visible portion of the display device; and
    responsive to the determining, outputting, by the computing device, an updated visual aspect of a scrollbar slider displayed at the display device, the updated visual aspect being indicative of an overscrolling event and comprising a curving back of the scrollbar slider in a second direction opposite the first direction.

2. The computer-implemented method of claim 1, wherein outputting the updated visual aspect includes outputting an updated color of the scrollbar slider.

3. The computer-implemented method of claim 1, wherein outputting the updated visual aspect includes outputting an updated portion of the scrollbar slider.

4. The computer-implemented method of claim 1, wherein outputting the updated visual aspect includes outputting an updated size of at least a portion of the scrollbar slider.

5. The computer-implemented method of claim 1, wherein outputting the updated visual aspect includes outputting an updated representation of at least a portion of the scrollbar slider.

6. A non-transitory processor readable storage medium having a plurality of instructions stored thereon that when executed by a processor, cause the processor to perform operations comprising:
    outputting, by a computing device and for display at a display device operatively coupled to the computing device, a graphical representation of at least one content item;
    receiving, by the computing device, an indication of a user input;
    responsive to receiving the indication of the user input, outputting, for display by the display device, a scrolling of at least a portion of the graphical representation of the at least one content item in a first direction along an axis of the display;
    determining, by the computing device, that the graphical representation of the at least one content item has reached a boundary associated with the display device; and
    responsive to the determining, outputting, by the computing device, an updated visual aspect of a scrollbar slider displayed at the display device, the updated visual aspect being indicative of an overscrolling event and comprising a curving back of the scrollbar slider in a second direction opposite the first direction.

7. The non-transitory processor readable storage medium of claim 6, wherein outputting the updated visual aspect includes outputting an updated color of the scrollbar slider.

8. The non-transitory processor readable storage medium of claim 6, wherein outputting the updated visual aspect includes outputting an updated portion of the scrollbar slider.

9. The non-transitory processor readable storage medium of claim 6, wherein outputting the updated visual aspect includes outputting an updated size of at least a portion of the scrollbar slider.

10. The non-transitory processor readable storage medium of claim 6, wherein outputting the updated visual aspect includes outputting an updated representation of at least a portion of the scrollbar slider.

11. A computing device comprising:
one or more processors configured to output, for display at a display device operatively coupled to the computing device, a graphical representation of at least one content item, the one or more processors being further configured to receive an indication of a user input, in response to receiving the indication of the user input, the one or more processors being further configured to output, for display by the display device, a scrolling of the graphical representation of the at least one content item in a first direction on the display;
the one or more processors being further configured to determine that the graphical representation of the at least one content item has reached a boundary associated with a visible portion of the display device, and in response to the determining, the one or more processors being further configured to output a new feature associated with a scrollbar slider displayed at the display device, the new feature being indicative of an overscrolling event and comprising a curving back of the scrollbar slider in a second direction opposite of the first direction.

12. The computing system of claim 11, wherein outputting the new feature of the scrollbar slider includes outputting an updated color of the scrollbar slider.

13. The computing system of claim 11, wherein outputting the new feature of the scrollbar slider includes outputting an updated portion of the scrollbar slider.

14. The computing system of claim 11, wherein outputting the new feature of the scrollbar slider includes outputting an updated size of at least a portion of the scrollbar slider.

15. The computing system of claim 11, wherein outputting the new features of the scrollbar slider includes outputting an updated representation of at least a portion of the scrollbar slider output.

* * * * *